United States Patent
Garnepudi et al.

(10) Patent No.: US 10,373,242 B2
(45) Date of Patent: *Aug. 6, 2019

(54) NETWORK TRAFFIC-BASED THROTTLING OF ELECTRONIC COMMERCE ACTIVITY

(71) Applicant: Target Brands, Inc., Minneapolis, MN (US)

(72) Inventors: Srikanth Garnepudi, Bangalore (IN); Srinivas Junnuru, Minneapolis, MN (US); LeAnn Lorbiecki, Minneapolis, MN (US); Hemant, Bangalore (IN); Kamran Makki, Bangalore (IN); Joel Seeger, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/816,342

(22) Filed: Nov. 17, 2017

(65) Prior Publication Data

US 2018/0075519 A1 Mar. 15, 2018

Related U.S. Application Data

(63) Continuation of application No. 14/033,167, filed on Sep. 20, 2013, now Pat. No. 9,875,500.

(51) Int. Cl.
*G06Q 30/06* (2012.01)
(52) U.S. Cl.
CPC .................. *G06Q 30/0637* (2013.01)
(58) Field of Classification Search
CPC .......... G06Q 30/0637; H05K 999/99
(Continued)

(56) References Cited

U.S. PATENT DOCUMENTS 5,897,622 A  4/1999  Blinn et al.
6,279,001 B1  8/2001  DeBettencourt et al.
(Continued)

FOREIGN PATENT DOCUMENTS

CA  2547507 A1  10/2007
WO  0135293 A1  5/2001

OTHER PUBLICATIONS

Coopee, Todd, "Net Access Manager Monitors Online Use Efficiently", Apr. 21, 1997, InfoWorld, pp. 48C. (Year: 1997).*
(Continued)

*Primary Examiner* — Jason B Dunham
*Assistant Examiner* — Brittany E Bargeon
(74) *Attorney, Agent, or Firm* — Shumaker & Sieffert, P.A.

(57) ABSTRACT

In general, network traffic-based electronic commerce (e-commerce) techniques are described. The techniques may potentially prevent website crashes caused by traffic spikes. An example method includes determining, by a computing device, a level of network traffic associated with accessing a website that provides one or more e-commerce capabilities, and comparing the level of network traffic against a threshold traffic level. The method further includes, responsive to determining that the level of network traffic exceeds the threshold traffic level, determining whether a purchase request received via the website identifies a limited time offer (LTO) that is currently available via the website, and when the purchase request identifies the LTO, denying the purchase request with respect to the LTO at an add-to-cart stage.

20 Claims, 8 Drawing Sheets

(58) Field of Classification Search
USPC .................................................. 705/26.82
See application file for complete search history.

(56) References Cited

U.S. PATENT DOCUMENTS

| | | | |
|---|---|---|---|
| 7,152,102 | B2 | 12/2006 | Brinton et al. |
| 7,386,950 | B2 | 6/2008 | Fast et al. |
| 7,403,907 | B1 | 7/2008 | Gerken, III et al. |
| 7,606,900 | B2 | 10/2009 | Martin et al. |
| 7,734,726 | B2 | 6/2010 | Dantzig et al. |
| 8,112,471 | B2 | 2/2012 | Wei et al. |
| 8,175,923 | B2 | 5/2012 | Gerken, III et al. |
| 8,255,563 | B2 | 8/2012 | Audenaert et al. |
| 8,260,953 | B2 | 9/2012 | Audenaert et al. |
| 8,296,451 | B2 | 10/2012 | Lowery et al. |
| 8,543,900 | B1 | 9/2013 | Kent |
| 9,875,500 | B2 * | 1/2018 | Garnepudi ......... G06Q 30/0637 |
| 2003/0101265 | A1 * | 5/2003 | Dantzig .................. G06F 9/505 |
| | | | 709/226 |
| 2003/0187934 | A1 | 10/2003 | Nishikawa et al. |
| 2006/0069763 | A1 * | 3/2006 | Kido ................... H04L 67/1008 |
| | | | 709/223 |
| 2006/0193250 | A1 | 8/2006 | Desjardins et al. |
| 2006/0230144 | A1 | 10/2006 | Shah |
| 2007/0008884 | A1 | 1/2007 | Tang |
| 2007/0245351 | A1 * | 10/2007 | Sussman .................... G06F 9/50 |
| | | | 718/104 |
| 2011/0158097 | A1 | 6/2011 | Chang et al. |
| 2011/0313840 | A1 * | 12/2011 | Mason ................... G06Q 30/02 |
| | | | 705/14.35 |
| 2012/0124666 | A1 | 5/2012 | Kim et al. |
| 2012/0185329 | A1 | 7/2012 | Audenaert et al. |
| 2012/0303697 | A1 | 11/2012 | Alslad |
| 2013/0151322 | A1 | 6/2013 | Coviello et al. |
| 2013/0163432 | A1 | 6/2013 | Belanger et al. |
| 2014/0089116 | A1 | 3/2014 | Argue et al. |
| 2014/0214609 | A1 | 7/2014 | Pedley et al. |

OTHER PUBLICATIONS

Notice of Allowance from U.S. Appl. No. 14/033,239, dated Apr. 15, 2015, 13 pgs.
Anonymous, "Sears Holdings Ranked Third in Multichannel Retailer Web Traffic," PR Newswire, Dec. 8, 2009, 4 pgs.
Coopee, Todd, "Net Access Manager Monitors Online Use Efficiently", Apr. 21, 1997, InfoWorld, pp. 48C.
Office Action from Canadian Patent Application No. 2,831,241, dated Aug. 19, 2014 (2 pages).
Office Action from Canadian Patent Application No. 2,831,235, dated Sep. 10, 2014 (2 pages).
Office Action from Canadian Patent Application No. 2,831,235, dated May 7, 2014 (2 pages).
Office Action from Canadian Patent Application No. 2,842,974, dated Sep. 11, 2014 (3 pages).
Office Action from Canadian Patent Application No. 2,831,235, dated Jan. 9, 2014 (4 pages).
Office Action from Canadian Patent Application No. 2,831,241, dated Jan. 21, 2014 (5 pages).
Anonymous, Sears Holdings Ranked Third in Multichannel Retailer Web Traffic, Dec. 8, 2009; PR Newswire.
Prosecution History from U.S. Appl. No. 14/033,167, dated Jun. 3, 2016 through Aug. 24, 2017, 86 pp.

* cited by examiner

NETWORK TRAFFIC-BASED THROTTLING OF ELECTRONIC COMMERCE ACTIVITY

This application is a continuation of U.S. application Ser. No. 14/033,167, filed Sep. 20, 2013, which is incorporated herein by reference in its entirety.

TECHNICAL FIELD

This disclosure generally relates to electronic commerce ("e-commerce").

BACKGROUND

Merchandisers may offer various products for sale via interactive electronic commerce (or "e-commerce") websites, such as online stores. The interactive website may enable consumers to access product inventory available via the online store, select various products for purchase, and provide payment and other information (e.g., shipping information) to complete the e-commerce transaction. Additionally, merchandisers may offer purchasing incentives or promotions for certain products available via the online store, such as temporary price cuts, temporary "buy one, get one" deals, and various others.

SUMMARY

In various scenarios, network servers that host, administrate, or are otherwise associated with the e-commerce website may experience heavy network traffic due to various factors, such as a popular product promotion, or external (e.g., weather-related) factors that cause sudden spikes in demand for a particular product. In some cases, such network traffic may exceed the capacity of the network servers to service the network traffic, thereby possibly resulting in a failure (or "crash") of the website. In turn, a crash of the e-commerce website during times of high consumer interest may diminish the user experience, potentially causing the merchandiser to lose customer goodwill.

Techniques of this disclosure are generally directed to alleviating malfunctioning of interactive e-commerce websites due to increases in network traffic at the website. In examples, a system (e.g., comprising one or more computing devices) that administrates an e-commerce website may implement the techniques to monitor network traffic via the website. Additionally, the system may compare the current network traffic against various traffic thresholds, and use the results of the comparison to detect various stimuli with respect to the network traffic experienced by the website. Based on each detected stimulus, the system may throttle the network traffic, to a degree corresponding to the particular stimulus.

In one example, a method includes determining, by a computing device, a level of network traffic associated with accessing a website that provides one or more electronic commerce (e-commerce) capabilities, and comparing the level of network traffic against a threshold traffic level. The method further includes, responsive to determining that the level of network traffic exceeds the threshold traffic level, determining whether a purchase request received via the website identifies a limited time offer (LTO) that is currently available via the website, and when the purchase request identifies the LTO, denying the purchase request with respect to the LTO at an add-to-cart stage.

In another example, a device includes a memory and one or more programmable processors. The programmable processors may be configured to detect a first stimulus associated with network traffic associated with accessing a website that provides one or more electronic commerce (e-commerce) capabilities, and responsive to detecting the stimulus, determine whether a purchase request received via the website identifies a limited time offer (LTO) currently available via the website, and when the purchase request identifies the LTO, deny the purchase request with respect to the LTO at an add-to-cart stage.

In another example, a computer-readable storage device is encoded with instructions. When executed, the instructions cause at least one programmable processor of a computing device to perform operations. The operations include detecting a first network traffic condition associated with a website that provides one or more electronic commerce (e-commerce) capabilities, and responsive to detecting the first network traffic condition associated with the website, determining whether a purchase request received via the website identifies a limited time offer (LTO) that is currently available via the website, and when the purchase request identifies the LTO, denying the purchase request with respect to the LTO at an add-to-cart stage. The operations further include detecting a second network traffic condition associated with the website, and responsive to detecting the second network traffic condition associated with the website, denying all purchase requests received via the website at the add-to-cart stage. The operations further include detecting a third network traffic condition associated with the website, and responsive to detecting the third traffic condition associated with the website, routing all requests to access the website to a waiting page associated with the website.

The techniques of this disclosure may provide one or more potential advantages and enhancements over the functionalities provided by existing e-commerce websites. For instance, if a system implementing the techniques detects a first stimulus, such as network traffic levels reaching a threshold for the first time, the system may disable consumers from adding one or more promotional items to an online shopping cart. More specifically, the system may determine, based on the network traffic reaching the threshold level, that the spike in network traffic is caused by one or more popular promotional items available via the website. As a response to this stimulus, the system may attempt to alleviate or stem the network traffic spike by disabling consumers from adding one or more identified promotional items to their virtual shopping carts. By preventing the website from crashing in this manner, the system may implement the techniques to enabling continued functioning of the website, thereby assisting the merchandiser to maintain consumer goodwill.

The details of one or more examples of this disclosure are set forth in the accompanying drawings and the description below. Other features, objects, and advantages of the disclosure will be apparent from the description and drawings, and from the claims.

DETAILED DESCRIPTION

Figure 1:
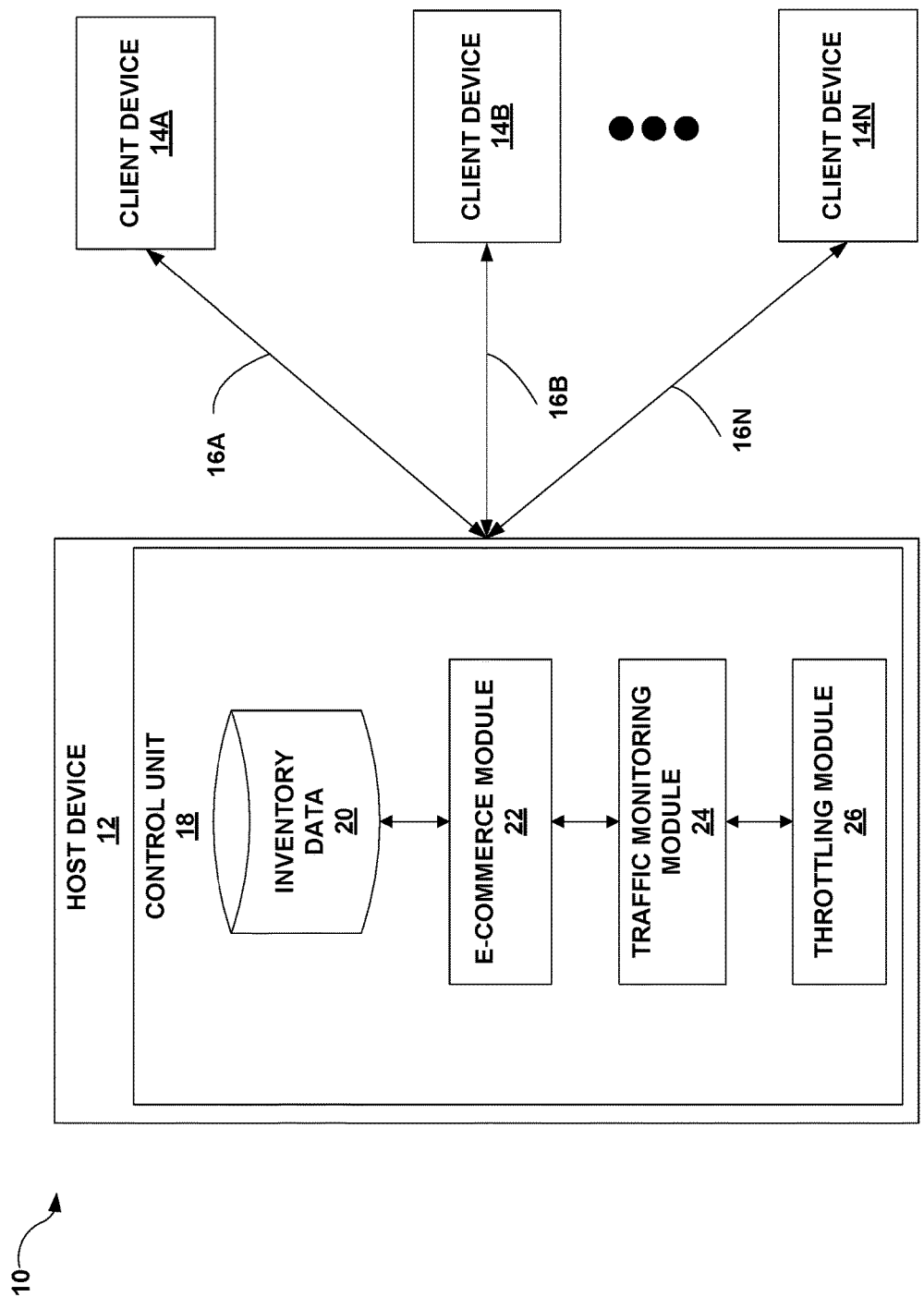
FIG. 1 is a conceptual diagram illustrating an example network system in which a host device may throttle electronic commerce (e-commerce) interactions with multiple client devices, based on network traffic data, in accordance with one or more aspects of this disclosure.

FIG. 1 is a conceptual diagram illustrating an example network system 10 in which host device 12 may throttle electronic commerce (e-commerce) interactions with multiple client devices 14A-14N based on network traffic data, in accordance with one or more aspects of this disclosure. In various examples, host device 12 may host, administrate, or be otherwise associated with an interactive e-commerce website, such as an online store (e.g., a "virtual store"). In turn, consumers may interact with the online store using one or more of client devices 14A-14N ("client devices 14").

Client devices 14 may represent one or more of a variety of devices that a user may use to access or otherwise interact with the online store associated with host device 12. In various examples, one or more of client devices 14 may include, be, or be part of a variety of devices, including mobile phones (including so-called "smartphones"), tablet computers, netbooks, ultrabooks, laptop computers, desktop computers, personal digital assistants ("PDAs"), set-top boxes, televisions, and watches, among others. In turn, each of client devices 14 may be communicatively coupled to host device 12 via respective communication links 16A-16N ("links 16"). In various examples, one or more of links 16 may represent network links, such as wired and/or wireless Internet connections.

As described, host device 12 may host, administrate, or be otherwise associated with an online store. While host device 12 is illustrated in FIG. 1 as a single device, it will be appreciated that the functionalities described herein with respect to host device 12 may, in various examples in accordance with this disclosure, be implemented across one or more devices, such as through distributed computing and/or cloud computing techniques. In various examples, host device 12 may include, be, or be part of a server device, such as a web server configured or otherwise operable to deliver web content to one or more of client devices 14.

In the example illustrated in FIG. 1, host device 12 includes control unit 18. Control unit 18 may, in various implementations, include any combination of one or more processors, one or more field programmable gate arrays (FPGAs), one or more application specific integrated circuits (ASICs), and one or more application specific standard products (ASSPs). Control unit 18 may also include memory, both static (e.g., hard drives or magnetic drives, optical drives, FLASH memory, EPROM, EEPROM, etc.) and dynamic (e.g., RAM, DRAM, SRAM, etc.), or any other computer-readable storage device or non-transitory computer readable storage medium capable of storing instructions that cause one or more processors (e.g., of control unit 18) to perform one or more of the techniques described in this disclosure.

Thus, control unit 18 may represent hardware, or a combination of hardware and software, to support the below described components, modules or elements, and the techniques should not be strictly limited to any particular embodiment described below. Although various components of host device 12 are illustrated as being included in control unit 18 in FIG. 1, it will be appreciated that one or more of these components, may be situated externally to control unit 18 in various implementations. In any implementation in accordance with this disclosure, whether control unit 18 includes hardware, or a hardware/software combination, control unit 18 may be referred to as a "hardware control unit."

Additionally, control unit 18 may include or otherwise implement one or more components and/or modules of host device 12. In the example of FIG. 1, control unit 18 includes inventory data 20, and implements electronic commerce ("e-commerce") module 22, traffic monitoring module 24, and throttling module 26. Inventory data 20 may represent various repositories of data, and may be stored to one or more devices capable of storing data that are included in control unit 18, and/or accessible to control unit 18. In specific examples, inventory data 20 may form a portion of a database implemented by host device 12, using control unit 18.

Specifically, inventory data 20 may include data associated with products available via the interactive website hosted by host device 12. As used herein, the term "product" may represent items (e.g., goods), services, or any other tangible or intangible entity that is available for purchase. In an example where the interactive website is associated with a retailer of goods, inventory data 20 may include data, such as pricing information, stock-keeping unit (SKU) numbers, available item counts, etc. associated with particular goods that the retailer may offer for sale via the website. Similarly, in examples where the interactive website is associated with a service provider, inventory data 20 may include data such as service costs, frequency of services required, etc. associated with particular services that the service provider may offer for sale via the website. In sum, inventory data 20 may include data pertinent to products that are available for sale via the website hosted by host device 12.

Host device 12 may dynamically update inventory data 20 to reflect promotions and other purchase incentives offered via the interactive website. For instance, host device 12 may update inventory data 20 to reflect temporary price cuts or "sales" for particular products (e.g., items on clearance), buy-one-get-one offers, and others. More specifically, host device 12 may update inventory data 20 to reflect time limits for such promotions, such as the start and end dates of sales. Promotions that are valid for a defined, finite period of time may be referred to herein as limited time offers, or "LTOs."

As shown in FIG. 1, control unit 18 may also include e-commerce module 22. E-commerce module 22 may provide one or more e-commerce capabilities via the interactive website. As one example, e-commerce module 22 include may enable users of one or more of client devices 14 to designate products for purchase, such as by selecting products for placement into a virtual shopping cart. As another example, e-commerce module 22 may enable users of one or more of client devices 14 to edit the virtual shopping cart, such as by removing products, and/or by changing the quantities of particular products already in the virtual shopping cart. As yet another example, e-commerce module 22 may enable users of one or more of client devices 14 to "checkout" using a current version of the virtual shopping cart, such as by completing an order by providing payment and shipping information.

In the implementation illustrated in FIG. 1, control unit 18 also includes traffic monitoring module 24. Traffic monitoring module 24 may be configured or otherwise operable to discern network traffic conditions experienced by host device 12, in association with operation of the interactive website. In some examples, traffic monitoring module 24 may determine levels of network traffic associated with accessing the website, such as data traffic that client devices 14 route to host device 12 over respective links 16. In turn, traffic monitoring module 24 may detect one or more stimuli with respect to network traffic elicited by the website hosted by host device 12. For instance, traffic monitoring module 24 may compare the level of network traffic against a threshold traffic level. If the current level of network traffic exceeds the threshold, traffic monitoring module 24 may detect a first stimulus.

According to various examples, traffic monitoring module 24 may determine the threshold network traffic level in various ways. In on example, traffic monitoring module 24 may receive the threshold network traffic level via user input, such as an input provided by a network administrator. In another example, traffic monitoring module 24 may use a predefined default value as the threshold network level. In still another example, traffic monitoring module 24 may dynamically generate a value for the threshold network traffic level. To dynamically generate the threshold network traffic level, traffic monitoring module 24 may use various criteria, such as processing capabilities of host device 12, network bandwidth available to host device 12, and various others.

The threshold network traffic level may, in various examples, correspond to a network traffic level that is set based on one or more features of host device 12. In some examples, traffic monitoring module 24 may determine the threshold network traffic level based on traffic-handling capabilities of host device 12. For instance, traffic monitoring module 24 may set the threshold network traffic level that is a certain amount below the maximum traffic-handling capacity of host device 12. By setting the threshold below the maximum traffic-handling capacity of host device 12, traffic monitoring module 24 may trigger an alert to remediate the traffic, before the traffic causes a crash of the website. In other words, traffic monitoring module 24 may build in a "cushion" as part of the threshold determination.

Based on traffic monitoring module 24 detecting the first stimulus (i.e., that the current network traffic level elicited by the website exceeds the threshold), throttling module 26 may implement one or more responsive measures. For instance, throttling module 26 may determine whether a purchase request received via the website, from one or more of client devices 14, identifies an LTO that is currently available through the website. In accordance with the responsive measures to the first stimulus, if throttling module 26 determines that the purchase request identifies a currently-available LTO, throttling module 26 may deny the purchase request with respect to the LTO.

In some examples, throttling module 26 may deny the received purchase request at an add-to-cart stage of the purchase request. More specifically, throttling module 26 may deny a received request to add the LTO item to a virtual shopping cart. By denying all add-to-cart requests for LTO items, throttling module 26 may remediate the most recent spike in network traffic elicited by the website, which may be a potential cause of the current network traffic level exceeding the threshold level. More specifically, throttling module 26 may determine that the popularity of one or more current LTOs contributes to the recent spike in network traffic. In turn, by denying purchase requests for the LTO items at the add-to-cart stage, throttling module 26 may attempt to alleviate the current network load caused by heavy purchase activity via the website. By alleviating the network load in this manner, throttling module 26 may potentially reduce the level of network traffic handled by host device 12 to below the threshold level.

In turn, traffic monitoring module 24 may determine a second level of network traffic for the website. More specifically, traffic monitoring module 24 may determine the second level of network traffic after throttling module 26 attempts to alleviate network traffic at the website, in response to detecting the first stimulus (i.e., the network traffic level initially exceeding the threshold level). In some examples, traffic monitoring module 24 may determine the second level of network traffic after a predetermined time lapse following the implementation of the responsive measures by throttling module 26. By adding such a time lapse, traffic monitoring module 24 may allow for the responsive measures to take effect on a sample size of incoming traffic, such as purchase requests, before determining the second level of network traffic. In this manner, traffic monitoring module 24 may determine the second level of network traffic to more accurately reflect the effect of the responsive measures implemented by throttling module 26 in response to the first stimulus.

Additionally, traffic monitoring module 24 may compare the second level of network traffic to the threshold network traffic level. More specifically, traffic monitoring module 24 may compare the second level of network traffic to the threshold, to determine whether the already-implemented responsive measures reduced the network traffic at the website to below the threshold. If traffic monitoring module 24 determines that the second level of network traffic exceeds the threshold, traffic monitoring module 24 may detect a second stimulus with respect to the network traffic via the website. Specifically, the second stimulus may indicate that the remedial measures implemented by throttling module 26 in response to the first stimulus failed to stem the network traffic sufficiently to fall below the predetermined threshold.

Responsive to traffic monitoring module 24 detecting the second stimulus, throttling module 26 may implement additional remedial measures, in an attempt to reduce the current network traffic via the website. For instance, throttling module 26 may deny all purchase requests received by host device 12 via the website. More specifically, throttling module 26 may deny all requests from client devices 14 to add an item to the virtual shopping cart, regardless of whether the item is associated with a current LTO. For instance, throttling module 26 may determine that the most recent spike in network traffic is either unrelated to the current LTOs, or that the current LTOs cause only a portion of the traffic spike. With respect to the latter scenario, throttling module 26 may determine that the traffic reduction caused by eliminating the LTO-caused traffic is insufficient to reduce the current network traffic to be less than the threshold.

By denying all purchase requests received via the website, throttling module 26 may attempt to remediate the most recent spike in network traffic elicited by the website. For instance, throttling module 26 may determine that the most recent spike in network traffic elicited by the website may be a potential cause of the current network traffic level exceeding the threshold level. More specifically, throttling module 26 may determine that the popularity of one or more currently-available items, whether any of the items is associated with a current LTO, contributes to the most recent spike in network traffic. In turn, by denying purchase requests for all available items at the add-to-cart stage, throttling module 26 may attempt to alleviate the current network load caused by heavy purchase activity via the website.

More specifically, by attempting to reduce the network load below the threshold in response to detecting the second stimulus, throttling module 26 may implement an enhanced remedial measure, based on the failure of an initial remedial measure. In this example, the initial remedial measure may include denying all purchase requests with respect to only LTOs. By alleviating the network load using the enhanced remedial measure, throttling module 26 may potentially reduce the level of network traffic handled by host device 12 to below the threshold level, after determining that implementing the initial remedial measure failed to reduce the network load to below the threshold traffic level.

In scenarios where throttling module 26 implements the enhanced remedial measures to deny all purchase requests at the add-to-cart stage, throttling module 26 may cause traffic monitoring module 24 to determine a third level of network traffic associated with the website. More specifically, traffic monitoring module 24 may determine the third level of network traffic after throttling module 26 attempts to alleviate network traffic at the website via the enhanced remedial measures, in response to detecting the second stimulus (i.e., the second network traffic level exceeding the threshold level). Similarly to as described with respect to the second traffic level, in some examples, traffic monitoring module 24 may determine the third level of network traffic after a predetermined time lapse following the implementation of the enhanced remedial measures by throttling module 26.

Additionally, traffic monitoring module 24 may compare the third level of network traffic to the threshold network traffic level. More specifically, traffic monitoring module 24 may compare the third level of network traffic to the threshold, to determine whether the enhanced remedial measures, already implemented by throttling module 26, are successful in reducing the network traffic at the website below the threshold. If traffic monitoring module 24 determines that the third level of network traffic exceeds the threshold, traffic monitoring module 24 may detect a third stimulus with respect to the network traffic via the website. Specifically, the third stimulus may indicate that both the remedial measures implemented by throttling module 26 in response to the first stimulus, as well as the enhanced remedial measures implemented by throttling module 26 in response to the second stimulus, failed to stem the network traffic sufficiently to fall below the predetermined threshold.

Responsive to traffic monitoring module 24 detecting the third stimulus, throttling module 26 may implement additional remedial measures, to mitigate or avoid any potential effects of traffic overload, such as a crash or other unscheduled shutdown of the website. In some implementations, throttling module 26 may route all incoming requests to access the website to a preselected webpage, such as a so-called "waiting page." For instance, throttling module 26 may deny all requests from client devices 14 to access any portion of the website, except for the waiting page. For instance, if traffic monitoring module 24 detects that the third traffic level continues to exceed the threshold traffic level, subsequent to throttling module 26 implementing the enhanced remedial measures, throttling module 26 may determine that the most recent spike in network traffic is either unrelated to purchase requests, or that the recent purchase requests cause only a portion of the traffic spike. With respect to the latter scenario, throttling module 26 may determine that the traffic reduction caused by eliminating the purchase-related traffic is insufficient to reduce the current network traffic to be less than the threshold.

More specifically, traffic monitoring module 24 may cause e-commerce module 22 to respond to all website-access requests received from client devices 14 by outputting data associated with a waiting page. In various examples, the waiting page may be associated with a static webpage, i.e. a webpage that includes the same data/information, regardless of the characteristics of particular input that invokes the webpage. According to various implementations of the techniques described herein, e-commerce module 22 may respond to transmit data associated with the waiting page to one or more of client devices 14 from which host device 12 receives a request to access the web site. More specifically, e-commerce module 22 may transmit data that the respective client device(s) 14 may use to generate the waiting page for display. For instance, the respective client device(s) 14 that receive the data associated with the waiting page may generate a graphical version of the waiting page, and output the graphical waiting page via a web browser application.

By causing e-commerce module 22 to respond to all website-access requests by outputting the static waiting page, throttling module 26 may temporarily suspend a substantial portion of the interactive traffic elicited by the website. For instance, throttling module 26 may classify the cause of the most recent spike as indeterminate. Consequently, throttling module 26 may cause e-commerce module 22 to output the waiting page in response to all website-access requests, rather than expend computing resources to respond to each particular request received from client device(s) 14.

In some examples, throttling module 26 may cause e-commerce module 22 to output the waiting page in response to all access requests, until traffic monitoring module 24 detects that the current traffic level has dropped below the threshold. For instance, traffic monitoring module 24 may determine the current traffic level at predetermined intervals, and communicate one or more of the determined traffic levels to throttling module 26. In turn, if throttling module 26 determines that a particular traffic level received from traffic monitoring module 24 is below the threshold, throttling module 26 may cause e-commerce module 22 to cease outputting the waiting page in response to all access requests. Instead, throttling module 26 may re-enable e-commerce module 22 to process requests received from client devices 14, such as website-access requests, and purchase requests for items available via the website.

In other implementations, throttling module 26 may cause e-commerce module 22 to output the waiting page in response to all website-access requests, for a predetermined period of time. According to one example, control unit 18 may implement a timer. In this example, throttling module 26 may activate the timer in conjunction with the first instance of causing e-commerce module 22 to output the waiting page in response to all website-access requests. Additionally, according to this example, upon expiration of the timer, throttling module 26 may cause e-commerce module 22 to resume processing incoming requests, based on the specific characteristics of each request. In turn, throttling module 26 may begin a new cycle of detecting the first, second, and third stimuli.

By causing e-commerce module 22 to output the static waiting page in response to all website-access requests, throttling module 26 may prevent or otherwise reduce the odds of a website crash, caused by traffic spikes detected by traffic monitoring module 24. In some examples, by causing e-commerce module 22 to route all access requests to the waiting page, throttling module 26 may prevent website crashes until an administrator operating host device 12, whether locally or remotely, identifies the cause(s) of the traffic spike and implements one or more remedial measures. In other words, according to these examples, throttling module 26 may enable the administrator to alleviate or remediate the traffic spike to restore the full user experience provided by the website, while in the meantime, at least partially maintaining the user experience provided by the website, by potentially preventing the website from crashing.

As described herein, by causing e-commerce module 22 to route all access requests to the waiting page in response to detecting the third stimulus, throttling module 26 may implement a "catch-all" remedial measure, based on the failure of both the initial and enhanced remedial measures to reduce the traffic level below the threshold. In this example, the catch-all remedial measures may include e-commerce module 22 disabling one or more features of the full user-experience provided via the website, to prevent or otherwise lower the chances of a website crash due to a traffic spike. In turn, by potentially preventing a website crash caused by a traffic spike, throttling module 26 may implement the techniques described herein to maintain at least a partial user experience provided via the website, during remediation of the spike, or a freely-occurring reduction of network traffic at the website.

Figure 2:
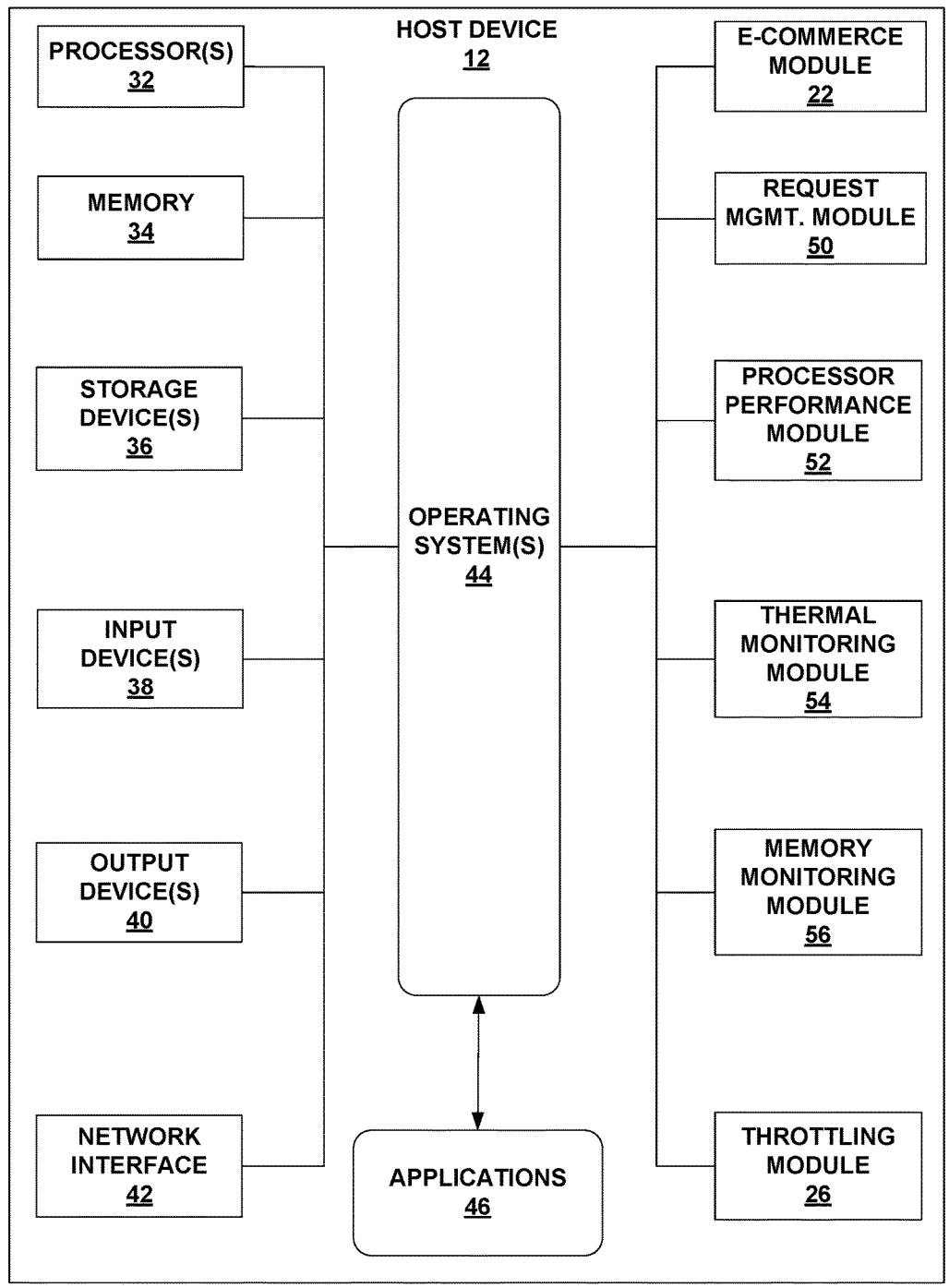
FIG. 2 is a block diagram illustrating further details of one example implementation of the host device of FIG. 1 configured to throttle e-commerce interactions based on network traffic data, in accordance with one or more aspects of this disclosure.

FIG. 2 is a block diagram illustrating further details of an example implementation of host device 12 illustrated in FIG. 1. As shown in the example of FIG. 2, host device 12 includes one or more processors 32, memory 34, one or more storage devices 36, one or more input devices 38, one or more output devices 40, and network interface 42. One or more processors 32 are, in some examples, configured to implement functionality and/or process instructions for execution within host device 12. For example, processors 32 may process instructions stored in memory 34 and/or instructions stored on storage devices 36. Such instructions may include components of operating system(s) 44, e-commerce module 22, request management module 50, processor performance module 52, thermal monitoring module 54, memory monitoring module 56, throttling module 26, and one or more applications 46. Host device 12 may also include one or more additional components not shown in FIG. 2, such as a power supply (e.g., a battery), among others.

Memory 34, in one example, is configured to store information within host device 12 during operation. Memory 34, in various examples, is described as a computer-readable medium, one or more computer readable storage medium/media, or one or more computer-readable storage device(s). In some examples, memory 34 is a temporary memory, meaning that a primary purpose of memory 34 may not be long-term storage. Memory 34, in some examples, is described as a volatile memory, meaning that memory 34 does not maintain stored contents when memory 34 is not receiving power. Examples of volatile memories include random access memories (RAM), dynamic random access memories (DRAM), static random access memories (SRAM), and other forms of volatile memories. In some examples, memory 34 is used to store program instructions for execution by processors 32. Memory 34, in one example, is used by software (e.g., by one or more operating systems 44) or applications (e.g., one or more applications 46) executing on host device 12 to temporarily store information during program execution.

One or more storage devices 36, in some examples, also include one or more computer-readable storage media and/or one or more computer-readable storage devices. In some examples, storage devices 36 may be configured to store greater amounts of information than memory 34. Storage devices 36 may further be configured for long-term storage of information. In some examples, storage devices 36 include non-volatile storage elements. Examples of such non-volatile storage elements include magnetic hard discs, optical discs, solid state discs, floppy discs, flash memories, forms of electrically programmable memories (EPROM) or electrically erasable and programmable memories, and other forms of nonvolatile memories.

As shown in FIG. 2, host device 12 may also include one or more input devices 38 and one or more output devices 40. Input devices 38 may include one or more of a keyboard, mouse, stylus, still camera, video camera, microphone, and other devices that are capable of receiving user input. Output devices 40 may include one or more of a monitor, speaker, video graphics adapter card, sound card, and any other device capable of generating output that may be intelligible to a user. Input devices 38 and/or output devices 40 may also include a touchscreen, presence-sensitive display, or any other input/output capable displays known in the art.

Host device 12, in various examples, also includes network interface 42. Host device 12, in one example, utilizes network interface 42 to communicate with external devices via one or more networks, such as one or more wireless networks. Network interface 42 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as universal serial bus (USB). In some examples, host device 12 utilizes network interface 42 to wirelessly communicate with external devices over a network, such as with client devices 14 over respective communication links 16, as illustrated in FIG. 1.

Operating system(s) 44 may control one or more functions of host device 12 and/or components thereof. For example, operating system 44 may interact with one or more of e-commerce module 22, request management module 50, processor performance module 52, thermal monitoring module 54, memory monitoring module 56, throttling module 26, and one or more applications 46. Additionally, operating system 44 may facilitate one or more interactions between e-commerce module 22, request management module 50, processor performance module 52, thermal monitoring module 54, memory monitoring module 56, throttling module 26, and one or more applications 46, and one or more of processors 32, memory 34, storage devices 36, input devices 38, and output devices 40. As shown in FIG. 2, operating system 44 may interact with, or be otherwise coupled to e-commerce module 22, request management module 50, processor performance module 52, thermal monitoring module 54, memory monitoring module 56, throttling module 26, and one or more applications 46, and components thereof.

In some examples, operating system 44 may include or otherwise provide functionalities described herein with respect to one or more of e-commerce module 22, request management module 50, processor performance module 52, thermal monitoring module 54, memory monitoring module 56, throttling module 26, and one or more applications 46. In some examples, one or more of e-commerce module 22, request management module 50, processor performance module 52, thermal monitoring module 54, memory monitoring module 56, and throttling module 26 may be included in applications 46. In other examples, one or more of e-commerce module 22, request management module 50, processor performance module 52, thermal monitoring module 54, memory monitoring module 56, and throttling module 26 may be implemented externally to host device 12, such as at a remote network location. In some such instances, host device 12 may use network interface 42 to access and implement functions provided by one or more of e-commerce module 22, request management module 50, processor performance module 52, thermal monitoring module 54, memory monitoring module 56, throttling module 26, and one or more applications 46, through techniques sometimes referred to as server-side processing, or cloud computing.

In various examples, traffic monitoring module 24 illustrated in FIG. 1 may include one or more of request management module 50, processor performance module 52, thermal monitoring module 54, and memory monitoring module 56. In other examples, one or more of request management module 50, processor performance module 52, thermal monitoring module 54, and memory monitoring module 56 may be communicatively coupled to traffic monitoring module 24. For ease of illustration purposes only, traffic monitoring module 24 is not illustrated with respect to FIG. 2.

Request management module 50 may be configured or otherwise operable to determine traffic levels based on a volume of purchase-related requests or orders received within a finite window of time. For instance, request management module 50 may determine a number of add-to-cart requests received via network interface 42 at a particular time. Additionally, request management module 50 may compare the determined number of received add-to-cart requests to a predetermined threshold number. In turn, if request management module 50 determines that the number of add-to-cart requests at a particular time exceeds the threshold, request management module 50 may detect one of the stimuli described above, with respect to the current network traffic level.

In one example implementation of the techniques described herein, request management module 50 may detect a stimulus with respect to traffic levels at the website, if request management module 50 determines that the current number of add-to-cart requests exceeds the amount of 50,000. In other words, according to this example, the threshold number of add-to-cart requests, or "break point," may be 50,000. In turn, request management module 50 may indicate detection of the stimulus to throttling module 26, thereby providing throttling module 26 a "trigger" to implement a corresponding remedial measure. For instance, request management module 50 may determine, based on user input, test results, or other available data, that the break point of 50,000 requests is associated with diminished performance of processor(s) 32.

More specifically, if the detected break point of 50,000 requests represents a first stimulus detected by request management module 50, then request management module 50 may provide throttling module 26 a trigger to implement the initial remedial measure of disabling add-to-cart capabilities with respect to LTO items currently available via the website. Alternatively, if the detected break point of 50,000 requests represents a second stimulus, request management module 50 may provide throttling module 26 a trigger to implement the enhanced remedial measure of disabling add-to-cart capabilities with respect to all items available via the website, irrespective of whether any item is associated with an LTO. Alternatively still, if the detected break point of 50,000 requests represents a third stimulus, request management module 50 may provide throttling module 26 a trigger to implement the catch-all remedial measure of routing all network traffic to the waiting page associated with the website. In this manner, request management module 50 may implement one or more techniques described above with respect to traffic monitoring module 24, based on a number of requests, such as purchase-related requests, received with respect to the website.

Processor performance module 52 may be configured or otherwise operable to monitor current performance statistics of processor(s) 32 of host device 12. In turn, processor performance module 52 may extrapolate or otherwise derive current network traffic levels based on the current performance statistics of processor(s) 32. For instance, processor performance module 52 may correlate particular performance statistics of processor(s) 32 to corresponding traffic levels that host device 12 receives, with respect to hosting the website. More specifically, processor performance module 52 may determine that if processor(s) 32 are utilized, or "taxed," to a particular extent, that host device 12 is currently expending a corresponding amount of computing resources to process the traffic elicited by the website.

In one implementation, processor performance module 52 may determine the performance statistics of processor(s) 32, based on a quantity of clock cycles currently available to processor(s) 32. For instance, the capability of processor(s) 32 to process data may be expressed in a total number of clock cycles. More specifically, the number of clock cycles associated with processor(s) 32 may directly proportional to the capabilities of processor(s) 32 to process data. As a result, if processor performance module 52 determines that processor(s) 32 are currently utilizing a greater proportion of the total clock cycles for processing data, processor performance module 52 may determine that processor(s) 32 are currently more taxed with respect to processing website-related traffic. Conversely, if processor performance module 52 determines that processor(s) 32 are currently utilizing a lesser proportion of the total clock cycles for processing data, processor performance module 52 may determine that processor(s) 32 are currently less taxed with respect to processing website-related traffic. In other words, processor performance module 52 may determine that processor(s) 32 are currently less taxed, if processor(s) 32 currently have a greater number of clock cycles available for data processing.

According to some examples of the techniques described herein, processor performance module 52 may correlate particular quantities of available clock cycles, or values derived therefrom, to website-related traffic levels received by host device 12. For instance, if processor performance module 52 detects that a current count of available clock cycles has fallen to a predetermined ratio of the total clock cycles executable by processor(s) 32, then processor performance module 52 may detect a stimulus with respect to the network traffic elicited by the website, and provide a trigger to throttling module 26 to implement a corresponding remedial measure. Described inversely in terms of consumed clock cycles, if processor performance module 52 detects that a current count of consumed clock cycles has risen to a predetermined ratio of the total clock cycles executable by processor(s) 32, then processor performance module 52 may detect a stimulus with respect to the network traffic elicited by the website, and provide a trigger to throttling module 26 to implement a corresponding remedial measure. Additionally, according to these implementations, the predetermined clock cycle ratios may be associated with corresponding break points, based on which processor performance module 52 may determine whether to communicate a trigger to throttling module 26.

More specifically, if the detected break point of the predetermined clock cycle ratio represents a first stimulus detected by processor performance module 52, then processor performance module 52 may provide throttling module 26 a trigger to implement the initial remedial measure of disabling add-to-cart capabilities with respect to LTO items currently available via the website. Alternatively, if the detected break point of the predetermined clock cycle ratio represents a second stimulus, processor performance module 52 may provide throttling module 26 a trigger to implement the enhanced remedial measure of disabling add-to-cart capabilities with respect to all items available via the website, irrespective of whether any item is associated with an LTO. Alternatively still, if the detected break point of the predetermined clock cycle ratio represents a third stimulus, then processor performance module 52 may provide throttling module 26 a trigger to implement the catch-all remedial measure of routing all network traffic to the waiting page associated with the website. In this manner, processor performance module 52 may implement one or more techniques described above with respect to traffic monitoring module 24, based on current processing activity (e.g., expressed in consumed and/or available clock cycles) of processor(s) 32.

Thermal monitoring module 54 may be configured or otherwise operable to monitor quantities of heat generated by host device 12 and/or separate components thereof. In turn, thermal monitoring module 54 may extrapolate or otherwise derive current network traffic levels based on heat generated by host device 12 and/or one or more components of host device 12. For instance, thermal monitoring module 54 may correlate particular levels of heat emanating from processor(s) 32 to corresponding traffic levels that host device 12 receives, with respect to hosting the website.

More specifically, thermal monitoring module 54 may determine that if processor(s) 32 are taxed to a particular extent, that host device 12 is currently expending a corresponding amount of computing resources to process the traffic elicited by the website. In various examples, thermal monitoring module 54 may monitor levels of heat produced by storage device(s) 36 and/or memory 34. In examples where thermal monitoring module 54 monitors heat produced by two or more of processor(s) 32, memory 34, and storage device(s) 36, different heat thresholds may correlate to each component of host device 12, based on various physical, chemical, or other characteristics that vary across the components.

As described, thermal monitoring module 54 may monitor heat produced by various components of host device 12, or by an outer casing of host device 12. However, for ease of discussion purposes only, the functionalities of thermal monitoring module 54 are described below with respect to processor(s) 32. In various implementations, thermal monitoring module 54 may determine the level of heat produced by processor(s) 32, based on direct temperature measurements (e.g., expressed in degrees Farenheit, Celsius/Centigrade, and Kelvin), measurements of energy emanating from processor(s) 32 (e.g., expressed in Joules or British Thermal Units), and others. As some examples, thermal monitoring module 54 may determine the heat produced by processor(s) 32 using various measurement devices, such as a thermometer or calorimeter, which are not illustrated in FIG. 2 for ease of illustration purposes only. Additionally, thermal monitoring module 54 may determine, based on one or more characteristics that are unique to processor(s) 32, that a particular level of dissipated heat indicates that processor(s) 32 are taxed to an extent that processor(s) 32 may not function satisfactorily, thereby introducing a risk of a website crash.

Additionally, thermal monitoring module 54 may detect a break point, based on the heat dissipated by processor(s) 32 reaching a predetermined threshold level. In turn, if thermal monitoring module 54 detects a break point, thermal monitoring module 54 may communicate a trigger to throttling module 26, to cause throttling module 26 to implement corresponding remedial measures. More specifically, if the detected break point associated with the threshold heat level represents a first stimulus as measured by thermal monitoring module 54, then thermal monitoring module 54 may provide throttling module 26 a trigger to implement the initial remedial measure of disabling add-to-cart capabilities with respect to LTO items currently available via the website. Alternatively, if the detected break point associated with the threshold heat level represents a second stimulus, then thermal monitoring module 54 may provide throttling module 26 a trigger to implement the enhanced remedial measure of disabling add-to-cart capabilities with respect to all items available via the website, irrespective of whether any item is associated with an LTO. Alternatively still, if the detected break point associated with the threshold heat level represents a third stimulus, then thermal monitoring module 54 may provide throttling module 26 a trigger to implement the catch-all remedial measure of routing all network traffic to the waiting page associated with the website. In this manner, thermal monitoring module 54 may implement one or more techniques described above with respect to traffic monitoring module 24, based on amounts of heat generated by host device 12 and/or one or more components thereof.

Memory monitoring module 56 may be configured or otherwise operable to monitor current usage or utilization of memory 34 of host device 12. In turn, memory monitoring module 56 may extrapolate or otherwise derive current network traffic levels based on the current utilization of memory 34. For instance, memory monitoring module 56 may correlate particular utilization statistics of memory 34 to corresponding traffic levels that host device 12 receives, with respect to hosting the website. More specifically, memory monitoring module 56 may determine that if memory 34 is utilized to a particular extent, that host device 12 is currently expending a corresponding amount of computing resources to process the traffic elicited by the website.

In one implementation, memory monitoring module 56 may determine the current utilization of memory 34, based on a quantity and/or ratio of memory 34 that is currently available for program execution. For instance, the capacity of memory 34 may be expressed in bytes (B), or multiples thereof, such as kilobytes (KB), megabytes (MB), gigabytes (GB), or terabytes (TB). If memory monitoring module 56 determines that a greater proportion of the memory 34 (e.g., expressed in MB) is currently available, then memory monitoring module 56 may determine that memory 34 is currently being utilized to a lesser extent, and that therefore, host device 12 may further utilize memory 34 to process website-related traffic, without introducing a substantial risk of a website crash. Conversely, if memory monitoring module 56 determines that a lesser proportion of memory 34 is currently available, then memory monitoring module 56 may determine that memory 34 is currently being used to a greater extent. Based on whether the available portion of memory 34 is above a predetermined availability threshold (and/or conversely, whether the currently-utilized portion of memory 34 is below a utilization threshold), memory monitoring module 56 may determine whether the current traffic level poses a potential threat of a website crash.

According to some examples of the techniques described herein, memory monitoring module 56 may correlate particular utilization and/or availability statistics associated with memory 34 to website-related traffic levels received by host device 12. For instance, if memory 34 detects that currently available memory has fallen below the predetermined availability threshold, then memory monitoring module 56 may detect a stimulus with respect to the network traffic elicited by the website, and provide a trigger to throttling module 26 to implement a corresponding remedial measure. Described inversely in terms of utilized memory, if memory monitoring module 56 detects that current memory utilization has risen above the predetermined utilization threshold, then memory monitoring module 56 may detect a stimulus with respect to the network traffic elicited by the website, and provide a trigger to throttling module 26 to implement a corresponding remedial measure. Additionally, according to these implementations, the predetermined availability and utilization thresholds may be associated with corresponding break points, based on which memory monitoring module 56 may determine whether to communicate a trigger to throttling module 26.

More specifically, if the detected break point of the predetermined memory availability and/or memory utilization threshold represents a first stimulus detected by memory monitoring module 56, then memory monitoring module 56 may provide throttling module 26 a trigger to implement the initial remedial measure of disabling add-to-cart capabilities with respect to LTO items currently available via the website. Alternatively, if the detected break point of the memory availability and/or memory utilization threshold represents a second stimulus, then memory monitoring module 56 may provide throttling module 26 a trigger to implement the enhanced remedial measure of disabling add-to-cart capabilities with respect to all items available via the website, irrespective of whether any item is associated with an LTO. Alternatively still, if the detected break point of the memory availability and/or memory utilization represents a third stimulus, then memory monitoring module 56 may provide throttling module 26 a trigger to implement the catch-all remedial measure of routing all network traffic to the waiting page associated with the website. In this manner, memory monitoring module 56 may implement one or more techniques described above with respect to traffic monitoring module 24, based on currently utilized and/or currently available memory (e.g., expressed in MB or kb) associated with memory 34.

While components of the implementation of host device 12 illustrated in FIG. 2 have been described with respect to particular statistics for purposes of example, it will be appreciated that the illustrated components of host device 12 may use other statistics in determining break points, as well. For instance, one or both of processor performance module 52 and memory monitoring module 56 may determine break points based on thread counts. More specifically, a thread may represent the smallest sequence of instructions that may be managed and/or scheduled independently by a scheduler of operating system(s) 44. As one example, processor performance module 52 may determine a break point based on whether or not a threshold number of threads are currently being executed by processor(s) 32. As another example, memory monitoring module 56 may determine a break point based on whether or not a threshold number of threads currently reside in, or are currently loaded to, memory 34. In these thread-based examples, processor performance module 52 and memory monitoring module 56 may use different threshold values with respect to determining the respective break points.

Figure 3A:
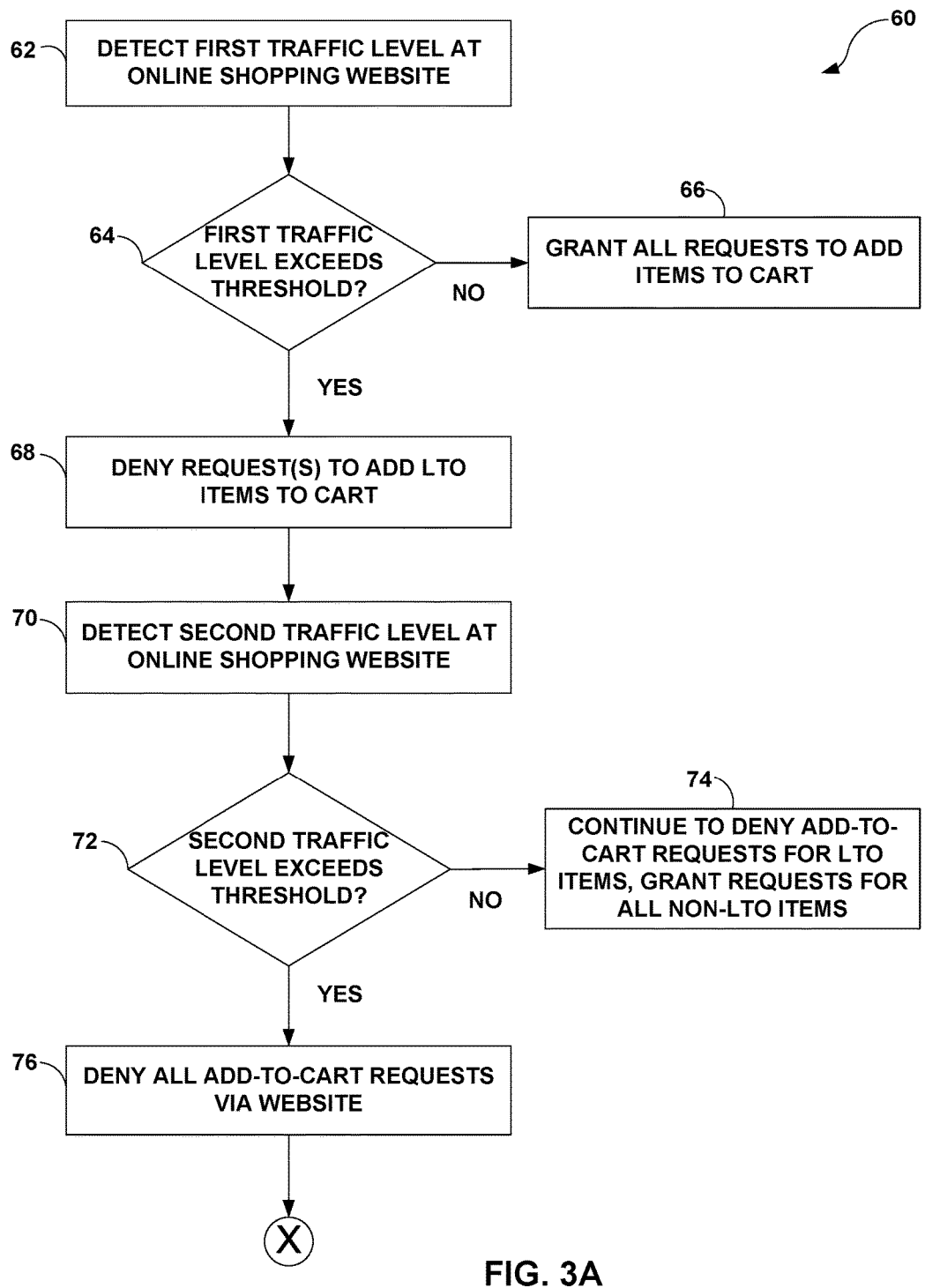
FIGS. 3A-3B are flowcharts illustrating an example process by which a system may throttle e-commerce interactions based on network traffic data, in accordance with one or more aspects of this disclosure.
Figure 3B:
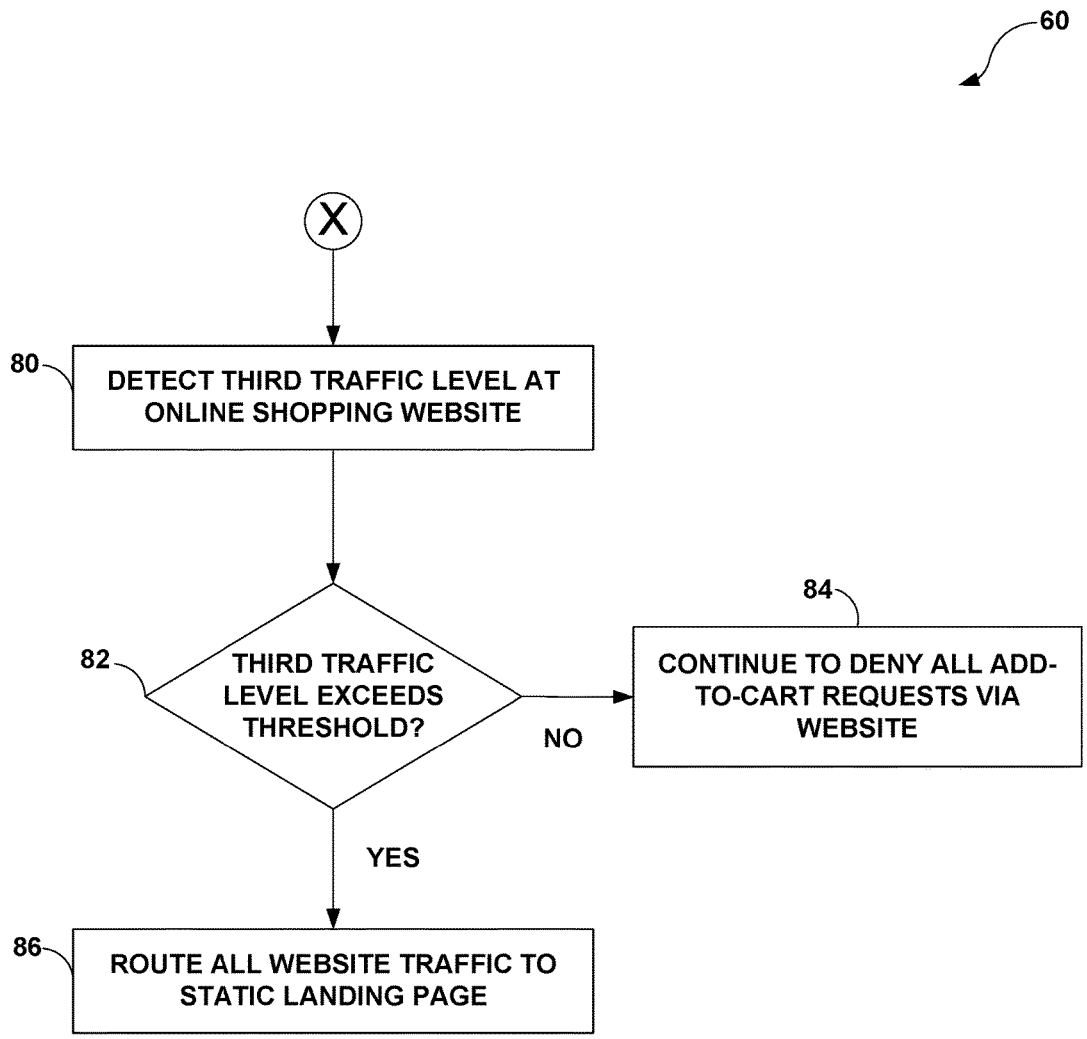

FIGS. 3A-3B are flowcharts illustrating an example process 60 by which a system may throttle e-commerce interactions based on network traffic data, in accordance with one or more aspects of this disclosure. Although process 60 may be performed by a variety of devices and/or combinations thereof, for ease of discussion purposes only, process 60 is described herein with respect to host device 12 illustrated in FIGS. 1-2, and various components thereof. Process 60 may begin when traffic monitoring module 24 of host device 12 detects a first traffic level at an online shopping website administrated by host device 12 (62). For instance, traffic monitoring module 24 may determine the first traffic level based on a number of purchase requests received by e-commerce module 22, with respect to the online shopping website.

Additionally, traffic monitoring module 24 may determine whether the first traffic level exceeds a threshold (64). In various examples, traffic monitoring module 24 may set the threshold value based on various criteria, such as one or more of hardware, software, and communication capabilities accessible to host device 12. Additionally, in some examples, traffic monitoring module 24 may dynamically update the threshold value, based on variations in current conditions, such as changes in available network bandwidth. Traffic monitoring module 24 may determine the threshold value, based on levels of network traffic that may potentially cause a crash or other unscheduled outage of the website. If traffic monitoring module 24 determines that the first traffic level is below or is equal to the threshold value ('NO' branch of 64), then e-commerce module 22 may grant all requests to add items to a virtual shopping cart (66). In other words, e-commerce module 22 may provide or enable add-to-cart capabilities to users who access the online shopping website, with respect to all items currently available via the website. More specifically, in this scenario, e-commerce module 22 may not impose any restrictions on add-to-cart capabilities, so long as the requested quantity of the item is currently available via the online shopping website.

On the other hand, if traffic monitoring module 24 determines that the first traffic level exceeds the threshold value ('YES' branch of 64), then throttling module 26 may cause e-commerce module 22 to deny one or more requests to add LTO items to a virtual shopping cart via the online shopping website (68). More specifically, based on traffic monitoring module 24 determining that the first traffic level exceeds the threshold value, throttling module 26 may determine that the most recent spike in network traffic at the online shopping website is at least partially attributable to one or more LTOs currently offered via the website. Additionally, in response to traffic monitoring module 24 determining that the first traffic level exceeds the threshold value, throttling module 26 may implement the initial remedial measures described above, to potentially alleviate the current level of network traffic processed by host device 12.

Additionally, traffic monitoring module 24 may detect a second traffic level at the online shopping website (70). For example, traffic monitoring module 24 may detect the second traffic level subsequently to throttling module 26 implementing the initial remedial measures of causing e-commerce module 22 to deny one or more add-to-cart requests for LTO items. More specifically, in this example, traffic monitoring module 24 may detect the second traffic level as a means of determining whether the initial remedial measures implemented by throttling module 26 successfully reduced the network traffic load to reach or fall below the predetermined threshold value.

In turn, traffic monitoring module 24 may determine whether the second traffic level exceeds the threshold (72). If traffic monitoring module 24 determines that the second traffic level is below or is equal to the threshold value ('NO' branch of 72), then e-commerce module 22 may continue to deny requests to add LTO items to a virtual shopping cart, but may grant all requests to add all non-LTO items, conditioned on current availability, to a virtual shopping cart (74). For instance, in this scenario, traffic monitoring module 24 may determine that the initial remedial measures implemented by throttling module 26 were successful in countering the recent traffic spike, and reduced website-related traffic to the threshold value or below. More specifically, throttling module 26 may cause e-commerce module 22 to impose the restriction of denying add-to-cart capabilities for LTO items, but continue to permit add-to-cart capabilities for non-LTO items. By imposing the restriction described above, throttling module 26 and e-commerce module 22 may implement one or more techniques of this disclosure to provide at least a partial user experience via the website, while potentially avoiding a website crash that may, in turn, entirely disable the user experience provided via the website.

Conversely, if traffic monitoring module 24 determines that the second traffic level exceeds the threshold value ('YES' branch of 72), then throttling module 26 may cause e-commerce module 22 to deny all add-to-cart requests received via the online shopping website (76). More specifically, based on traffic monitoring module 24 determining that the second traffic level exceeds the threshold value, throttling module 26 may determine that the implemented initial remedial measures did not alleviate website-related traffic sufficiently to reach or fall below the threshold value. Additionally, in response to traffic monitoring module 24 determining that the second traffic level exceeds the threshold value, throttling module 26 may implement the enhanced remedial measures described above, to potentially alleviate the current level of network traffic being processed by host device 12.

Additionally, traffic monitoring module 24 may detect a third traffic level at the online shopping website (80). For example, traffic monitoring module 24 may detect the third traffic level subsequently to throttling module 26 implementing the enhanced remedial measures of causing e-commerce module 22 to deny all add-to-cart requests received via the website. More specifically, in this example, traffic monitoring module 24 may detect the third traffic level as a means of determining whether the enhanced remedial measures implemented by throttling module 26 successfully reduced the network traffic load to reach or fall below the predetermined threshold value.

In turn, traffic monitoring module 24 may determine whether the third traffic level exceeds the threshold (82). If traffic monitoring module 24 determines that the third traffic level is below or is equal to the threshold value ('NO' branch of 82), then throttling module 26 may cause e-commerce module 22 to continue to deny all requests to add items to a virtual shopping cart via the online shopping website (84). For instance, in this scenario, traffic monitoring module 24 may determine the enhanced remedial measures implemented by throttling module 26 were successful in countering the recent traffic spike, and successfully reduced website-related traffic to the threshold value or below.

More specifically, throttling module 26 may cause e-commerce module 22 to impose the restriction of denying add-to-cart capabilities for all items offered for sale via the online shopping website, while maintaining other facets of the website, such as enabling users to browse currently-offered items, and to read or otherwise consume other data available on the website. By imposing the restriction described above, throttling module 26 and e-commerce module 22 may implement one or more techniques of this disclosure to provide at least a partial user experience via the online shopping website, while potentially avoiding a website crash that may, in turn, entirely disable the user experience provided via the website.

On the other hand, if traffic monitoring module 24 determines that the third traffic level exceeds the threshold value ('YES' branch of 82), then throttling module 26 may cause e-commerce module 22 to route all website-related traffic to a static landing page associated with the online shopping website (86). More specifically, based on traffic monitoring module 24 determining that the third traffic level exceeds the threshold value, throttling module 26 may determine that neither the implemented initial nor enhanced remedial measures alleviated website-related traffic sufficiently to reach or fall below the threshold value. Additionally, in response to traffic monitoring module 24 determining that the third traffic level exceeds the threshold value, throttling module 26 may implement the catch-all remedial measures described above, to potentially alleviate the current level of network traffic being processed by host device 12.

More specifically, in this scenario, throttling module 26 may cause e-commerce module 22 to impose the restriction of displaying a webpage associated with the online shopping website, while disabling all interactive capabilities that host device 12 may otherwise provide via the website. By imposing the restriction described above, throttling module 26 and e-commerce module 22 may implement one or more techniques of this disclosure to provide at least a partial user experience via the website, while potentially avoiding a website crash that may, in turn, entirely disable the user experience provided via the website.

FIGS. 4A-4D are conceptual diagrams illustrating example user interfaces (UIs) 90A-90D that one or more systems, such as client devices 14, may output in accordance with one or more network traffic-based e-commerce throttling techniques described herein. More specifically, host device 12 may transmit data to one or more of client devices 14, to cause the respective client devices 14 that receive(s) the data to output the corresponding one of UIs 90A-90D (collectively, "UIs 90"). It will be appreciated that, while a variety of devices or combinations thereof may generate and/or output UIs 90 according to the techniques described herein, for ease of discussion purposes only, UIs 90 of FIGS. 4A-4D are described herein with respect to host device 12 of FIGS. 1-2, and components thereof.

Figure 4A:
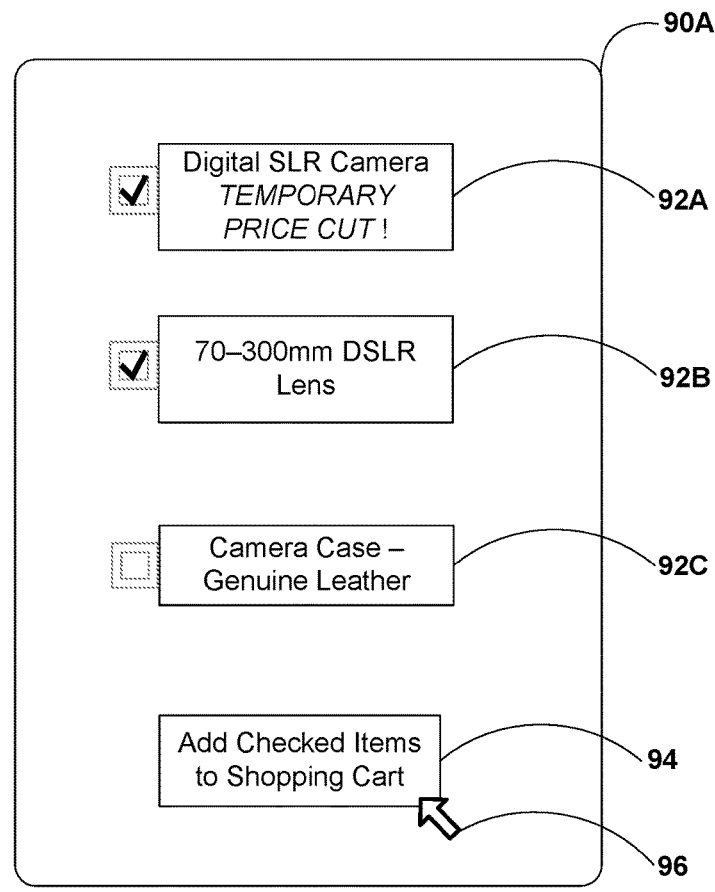
FIGS. 4A-4D are conceptual diagrams illustrating example user interfaces (UIs) that one or more systems may output in accordance with one or more network traffic-based e-commerce throttling techniques described herein.

FIG. 4A illustrates UI 90A, which host device 12 may cause one or more of client devices 14 to output, to enable a user to interact via the online shopping website. For instance, host device 12 may cause client devices 14 to display UI 90A within a web browser interface, in response to client devices 14 receiving a user input via the web browser to access a uniform resource locator (URL) that identifies the online shopping website. More specifically, client devices 14 may relay the URL access request, via respective communication links 16, to host device 12. In turn, host device 12 may transmit data, via respective communication links 16, to client devices 14, causing client devices 14 to output UI 90A. In various examples, host device 12 may transmit the data to client devices 14 in response to a series of relayed user inputs, such as a series of user inputs associated with a user navigating from a homepage of the online shopping website, to a webpage associated with UI 90A.

UI 90A includes several UI elements, including item listings 92A-92C ("collectively, item listings 92"), add-to-cart button 94, and cursor 96. A user may select one of item listings 92 for purchase-related requests, by placing cursor 96 over a checkbox of the corresponding item listing 92, and providing a selection input. As one example, the user may place cursor 96 over a checkbox using a mouse, and may provide the selection input by clicking or otherwise actuating a left-button of the mouse. In the specific scenario illustrated in FIG. 4A, the checkboxes corresponding to item listings 92A and 92B are in a "checked" state, indicating that a user has selected the items indicated by item listings 92A and 92B.

As illustrated in FIG. 4A, item listing 92A includes a notification that the associated item is available, with a temporary reduction in price. More specifically, the temporary price reduction, or price cut, may indicate that item listing 92A is associated with an LTO item. On the other hand, neither of item listings 92B and 92C includes a notification of a temporary price cut or other temporary purchase incentive, and as a result, neither of item listings 92B and 92C may be associated with an LTO item. In other words, both of item listings 92B and 92C may be associated with non-LTO items.

Host device 12 may a purchase-related request, such as an add-to-cart request, with respect to selected items represented within UI 90A. For instance, host device 12 may receive, from client devices 14, a relayed user input that indicates the add-to-cart request. For instance, the user may place cursor 96 over add-to-cart button 94, and click on add-to-cart button 94, to submit an add-to-cart request with respect to all currently selected items (which, in the example of FIG. 4A, includes the LTO item of item listing 92A, and the non-LTO item of item listing 92B). In turn, e-commerce module 22 of host device 12 may respond to the add-to-cart request, based on any restrictions or constraints currently implemented by throttling module 26.

Figure 4B:
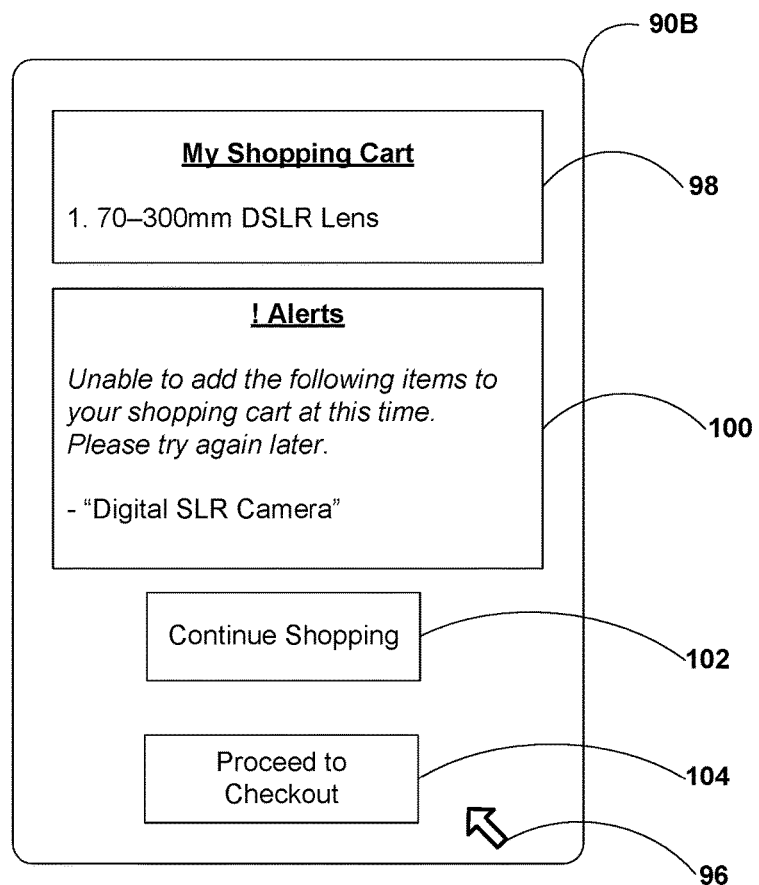

FIG. 4B illustrates UI 90B, which one or more of client devices 14 may output, based on data received from host device 12, while throttling module 26 is currently implementing the initial remedial measures described above. More specifically, while throttling module 26 implements the initial remedial measures, host device 12 may cause client devices 14 to output UI 90B, in response to receiving an add-to-cart request with respect to the item selections illustrated in FIG. 4A. UI 90B includes virtual shopping cart 98, alert module 100, shop button 102, and checkout button 96.

As shown, virtual shopping cart 98 includes an indication of a selected non-LTO item indicated by item listing 92B of FIG. 4A. Additionally, alert module 100 includes a notification that host device 12 is unable to add a selected LTO item indicated by item listing 92A. More specifically, based on the initial remedial measures implemented by throttling module 26, e-commerce module 22 may disable add-to-cart functionalities with respect to LTO items available via the online shopping website, while enabling add-to-cart functionalities with respect to non-LTO items. A user may continue to shop, such as by browsing other items available via the website, and potentially modifying the contents of virtual shopping cart 98, by clicking on shop button 102. Alternatively, if the user chooses to complete a purchase with the current contents of virtual shopping cart 98, the user may click on checkout button 96 to initiate a checkout process offered by host device 12 via the online shopping website. In various examples, the checkout process may include providing shipping information, payment information, and confirming the details of items being purchased. In this manner, host device 12 may cause client devices 14 to output UI 90B, to provide at least a partial user experience via the website, while potentially avoiding a website crash that may, in turn, entirely disable the user experience provided via the website.

Figure 4C:
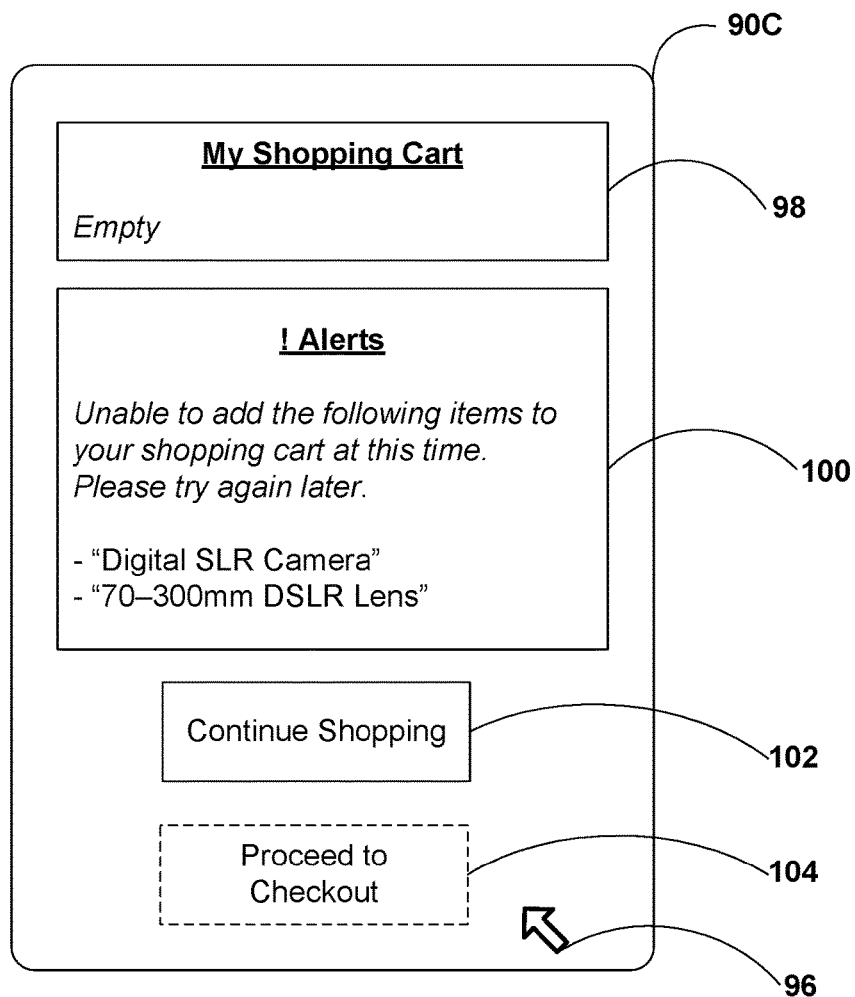

FIG. 4C illustrates UI 90C, which one or more of client devices 14 may output, based on data received from host device 12, while throttling module 26 is currently implementing the enhanced remedial measures described above. More specifically, while throttling module 26 implements the enhanced remedial measures, host device 12 may transmit data over communication links 16 to cause client devices 14 to output UI 90C, in response to receiving an add-to-cart request with respect to the item selections illustrated in FIG. 4A. Similarly to UI 90B illustrated in FIG. 4B, UI 90C includes virtual shopping cart 98, alert module 100, shop button 102, and checkout button 96.

As shown, virtual shopping cart 98 includes an indication that virtual shopping cart 98 is empty. Additionally, alert module 100 includes a notification that host device 12 is unable to add any of the selected items of FIG. 4A, which include one LTO item and one non-LTO item indicated, respectively, by item listings 92A and 92B. More specifically, based on the enhanced remedial measures implemented by throttling module 26, e-commerce module 22 may disable add-to-cart functionalities with respect to all items available via the online shopping website, irrespective of whether an available item is classified as an LTO. A user may continue to shop, such as by browsing other items available via the website, by clicking on shop button 102. However, based on virtual shopping cart 98 being empty, e-commerce module 22 may disable checkout capabilities. In the example of UI 90C, checkout button 104 is illustrated with dashed-line borders, to indicate that e-commerce module 22 has disabled the checkout capabilities. In various examples, host device 12 may cause client devices 14 to display checkout button 104 in a "grayed out" state to indicate the disabling, or alternatively, to not alter the appearance of checkout button 104, regardless of the current enablement/disablement status of the checkout capabilities. In this manner, host device 12 may cause client devices 14 to output UI 90C, to provide at least a partial user experience via the website, while potentially avoiding a website crash that may, in turn, entirely disable the user experience provided via the website.

Figure 4D:
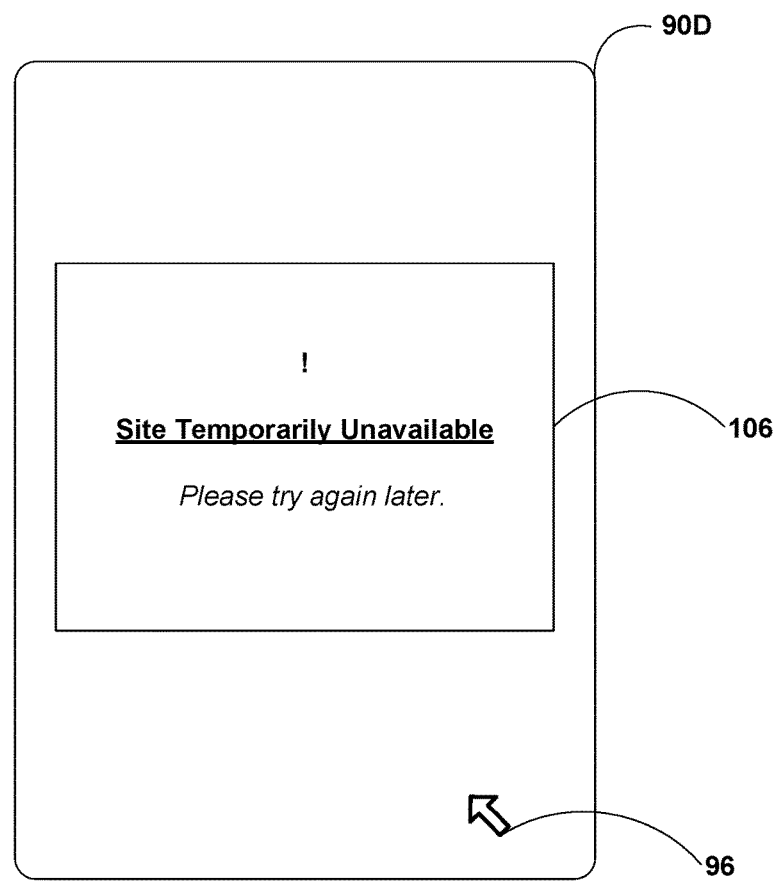

FIG. 4D illustrates UI 90D, which one or more of client devices 14 may output, based on data received from host device 12, while throttling module 26 is currently implementing the catch-all remedial measures described above. More specifically, while throttling module 26 implements the enhanced remedial measures, host device 12 may transmit data over communication links 16 to cause client devices 14 to output UI 90D, in response to receiving a request to access any portion of the online shopping website. UI 90D may include, be, or be part of an example waiting page, as described above with respect to the catch-all remedial measures implemented by throttling module 26.

UI 90D includes one or more UI elements, such as waiting alert 106. As shown, waiting alert 106 includes a notification indicating that the online shopping website is temporarily unavailable, and prompting the user to attempt to access the website at a subsequent time. In some examples, host device 12 may transmit data that causes waiting alert 106 to include a logo or other distinguishing mark associated with the online shopping website, thereby informing the user of the source of waiting alert 106. By causing client devices 14 to output waiting alert 106 while throttling module 26 implements the catch-all remedial measures of this disclosure, host device 12 may continue to provide at least a partial user experience via the online shopping website, while potentially avoiding a website crash that may, in turn, entirely disable the user experience provided via the website.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium or computer-readable storage device encoded with instructions. Instructions embedded or encoded in an article of manufacture including an encoded computer-readable storage medium or computer-readable storage device, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may comprise one or more computer-readable storage media.

In some examples, computer-readable storage media may comprise a tangible or non-transitory media, such as one or more computer-readable storage devices. The term "non-transitory" may indicate that the storage medium is not embodied in a carrier wave or a propagated signal. In certain examples, a non-transitory storage medium or non-transitory computer-readable storage device may store data that can, over time, change (for example, in RAM or cache).

Various examples have been described. These and other examples are within the scope of the following claims.

What is claimed is:

1. A method comprising:
    determining, by a computing device, a first level of network traffic associated with accessing a website that provides one or more electronic commerce (e-commerce) capabilities;
    comparing the first level of network traffic against a threshold traffic level; and
    responsive to determining that the first level of network traffic exceeds the threshold traffic level, denying, by the computing device, limited time offer (LTO) purchase requests received via the website at an add-to-cart stage;
    subsequent to denying the limited time offer (LTO) purchase requests, determining, by the computing device, a second level of network traffic associated with the website;
    comparing the second level of network traffic to the threshold traffic level; and
    responsive to determining that the second level of network traffic exceeds the threshold traffic level, disabling, by the computing device, checkout capabilities of the website.

2. The method of claim 1, further comprising:
    subsequent to determining that the second level of network traffic exceeds the threshold traffic level, determining, by the computing device, whether a virtual shopping cart associated with a user is empty; and
    responsive to determining that the virtual shopping cart associated with the user is empty, disabling the checkout capabilities of the website for the user.

3. The method of claim 1, further comprising displaying a checkout button on a user interface of the website associated with the user to indicate the disabling of the checkout capabilities of the website.

4. The method of claim 1, further comprising:
    subsequent to determining that the first level of network traffic exceeds the threshold traffic level, receiving, by the computing device, a request from a user to add an item subject to a limited time offer (LTO) to a virtual shopping cart associated with the user; and
    denying, by the computing device, the request from the user to add the item subject to the LTO to the virtual shopping cart associated with the user.

5. The method of claim 4, further comprising displaying a notification on a user interface associated with the user that the website is unable to add the item subject to the LTO to the virtual shopping cart associated with the user.

6. The method of claim 1, further comprising:
    subsequent to determining that the first level of network traffic exceeds the threshold traffic level, receiving, by the computing device, a request from a user to add an item that is not subject to a limited time offer (LTO) to a virtual shopping cart associated with the user; and
    adding, by the computing device, the item that is not subject to the LTO to the virtual shopping cart associated with the user.

7. The method of claim 1, further comprising:
    subsequent to determining that the second level of network traffic exceeds the threshold traffic level, receiving, by the computing device, a request from a user to add an item that is not subject to a limited time offer (LTO) to a virtual shopping cart associated with the user; and denying, by the computing device, the request from the user to add the item that is not subject to the LTO to the virtual shopping cart associated with the user.

8. The method of claim 7, further comprising displaying a notification on a user interface associated with the user that the website is unable to add the item that is not subject to the LTO to the virtual shopping cart associated with the user.

9. The method of claim 1, further comprising:
subsequent to determining that the first level of network traffic exceeds the threshold traffic level, receiving, by the computing device, a request from a user to initiate a check-out process with respect to items contained in a virtual shopping cart associated with the user; and
completing, by the computing device, the check-out process with respect to the items contained in the virtual shopping cart associated with the user.

10. The method of claim 1, further comprising:
responsive to determining that the second level of network traffic exceeds the threshold traffic level, disabling, by the computing device, a check-out button on a user interface associated with a user.

11. The method of claim 1, further comprising, responsive to determining that the second level of network traffic exceeds the threshold traffic level, denying, by the computing device, all purchase requests received via the website at the add-to-cart stage.

12. A computing system, comprising:
a memory; and
one or more programmable hardware processors configured to:
detect a first level of network traffic associated with accessing a website that provides one or more electronic commerce (e-commerce) capabilities;
compare the first level of network traffic against a threshold traffic level;
responsive to determining that the first level of network traffic exceeds the threshold traffic level, deny the limited time offer (LTO) purchase requests received via the website at an add-to-cart stage;
subsequent to denying the limited time offer (LTO) purchase requests, detect a second level of network traffic associated with the website;
compare the second level of network traffic to the threshold traffic level; and
responsive to determining that the second level of network traffic exceeds the threshold traffic level, disable checkout capabilities of the website.

13. The computing system of claim 12, wherein the one or more programmable hardware processors are further configured to:
subsequent to determining that the second level of network traffic exceeds the threshold traffic level, determine, by the computing device, whether a virtual shopping cart associated with a user is empty; and
responsive to determining that the virtual shopping cart associated with the user is empty, disable the check-out capabilities of the website for the user.

14. The computing system of claim 12, wherein the one or more programmable hardware processors are further configured to:
subsequent to determining that the first level of network traffic exceeds the threshold traffic level, receive a request from a user to add an item subject to a limited time offer (LTO) to a virtual shopping cart associated with the user; and deny the request from the user to add the item subject to the LTO to the virtual shopping cart associated with the user.

15. The computing system of claim 14, wherein the one or more programmable hardware processors are further configured to display a notification on a user interface associated with the user that the website is unable to add the item subject to the LTO to the virtual shopping cart associated with the user.

16. The computing system of claim 12, wherein the one or more programmable hardware processors are further configured to:
subsequent to determining that the first level of network traffic exceeds the threshold traffic level, receive a request from a user to add an item that is not subject to a limited time offer (LTO) to a virtual shopping cart associated with the user; and
add the item that is not subject to the LTO to the virtual shopping cart associated with the user.

17. The computing system of claim 12, wherein the one or more programmable hardware processors are further configured to:
subsequent to determining that the second level of network traffic exceeds the threshold traffic level, receive a request from a user to add an item that is not subject to a limited time offer (LTO) to a virtual shopping cart associated with the user; and
deny the request from the user to add the item that is not subject to the LTO to the virtual shopping cart associated with the user.

18. The computing system of claim 17, wherein the one or more programmable hardware processors are further configured to display a notification on a user interface associated with the user that the website is unable to add the item that is not subject to the LTO to the virtual shopping cart associated with the user.

19. The computing system of claim 12, wherein the one or more programmable hardware processors are further configured to:
subsequent to determining that the first level of network traffic exceeds the threshold traffic level, receive a request from a user to initiate a check-out process with respect to items contained in a virtual shopping cart associated with the user; and
complete the check-out process with respect to the items contained in the virtual shopping cart associated with the user.

20. A non-transitory computer-readable storage device encoded with instructions that, when executed, cause at least one programmable hardware processor of a computing device to perform operations comprising:
detecting a first level of network traffic associated with accessing a website that provides one or more electronic commerce (e-commerce) capabilities;
comparing the first level of network traffic against a threshold traffic level;
responsive to determining that the first level of network traffic exceeds the threshold traffic level, denying the limited time offer (LTO) purchase requests received via the website at an add-to-cart stage;
subsequent to denying the limited time offer (LTO) purchase requests, detecting a second level of network traffic associated with the website;
comparing the second level of network traffic to the threshold traffic level; and responsive to determining that the second level of network traffic exceeds the threshold traffic level, disabling checkout capabilities of the website.

\* \* \* \* \*